W. M. McKINNEY.
VEHICLE HEADLIGHT.
APPLICATION FILED JAN. 26, 1912.

1,032,924.

Patented July 16, 1912.
2 SHEETS—SHEET 1.

Witnesses
F. W. Ackman Jr.
V. B. Hillyard.

Inventor
William M. McKinney
By Victor J. Evans
Attorney

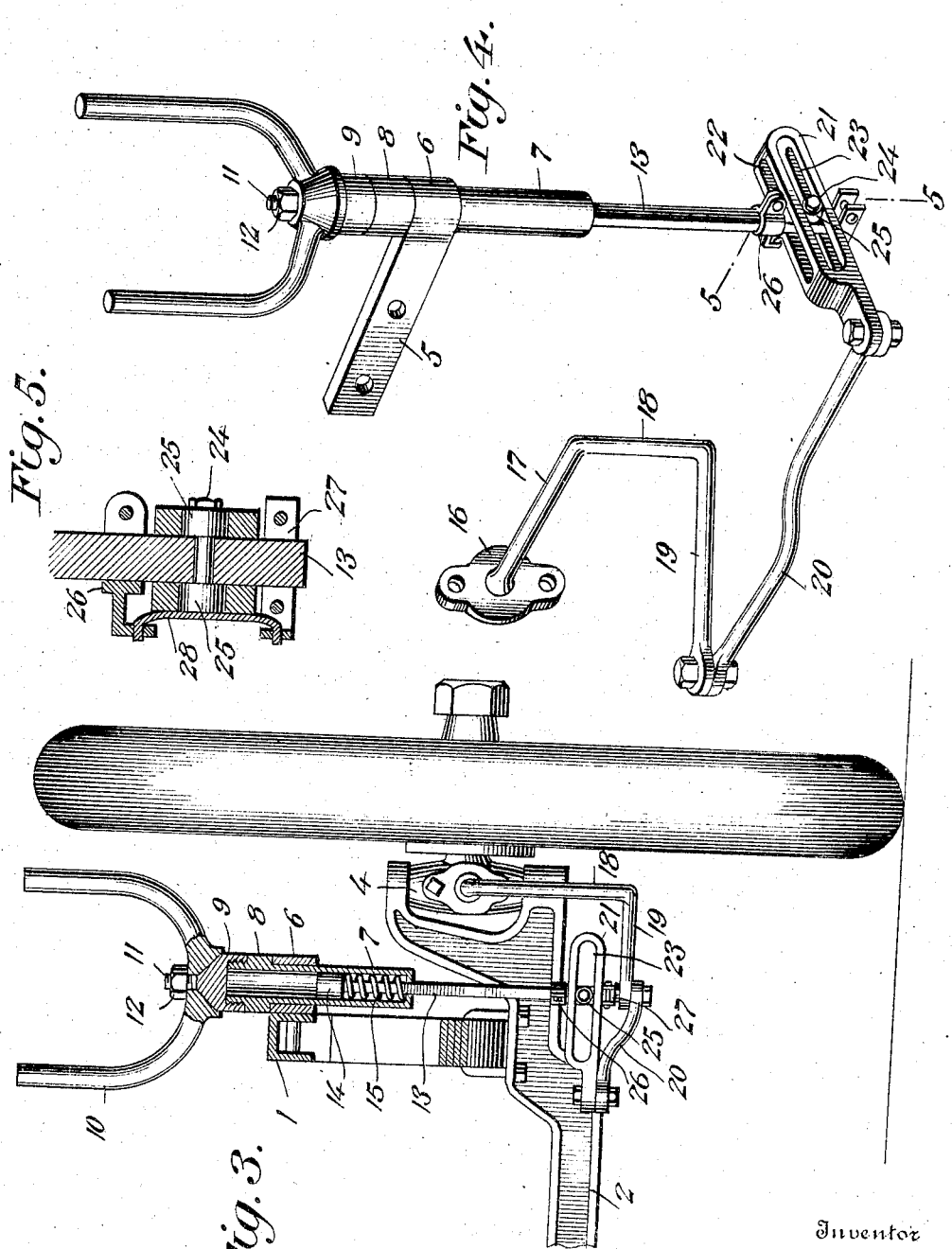

UNITED STATES PATENT OFFICE.

WILLIAM M. McKINNEY, OF CROWS LANDING, CALIFORNIA.

VEHICLE-HEADLIGHT.

1,032,924.

Specification of Letters Patent. Patented July 16, 1912.

Application filed January 26, 1912. Serial No. 673,574.

*To all whom it may concern:*

Be it known that I, WILLIAM M. MCKINNEY, a citizen of the United States, residing at Crows Landing, in the county of Stanislaus and State of California, have invented new and useful Improvements in Vehicle-Headlights, of which the following is a specification.

The present invention provides a headlight which is mounted to turn with the steering wheels of a mechanically propelled vehicle so that the roadway may be lighted in advance of the machine when rounding a curve or turning a corner, thereby enabling the objects to be seen in ample time to avoid a casualty should the road be obstructed.

The invention relates more particularly to the connecting means between the lamp support and the steering knuckle, whereby both move in unison so that a deviation of the vehicle from a direct course results in a corresponding deflection of the light so as to insure illumination of the roadway a safe distance in advance of the machine.

The invention consists of the novel features, details of construction and combination of parts, which hereinafter will be more particularly set forth, illustrated in the accompanying drawings, and pointed out in the appended claims.

Figure 1:
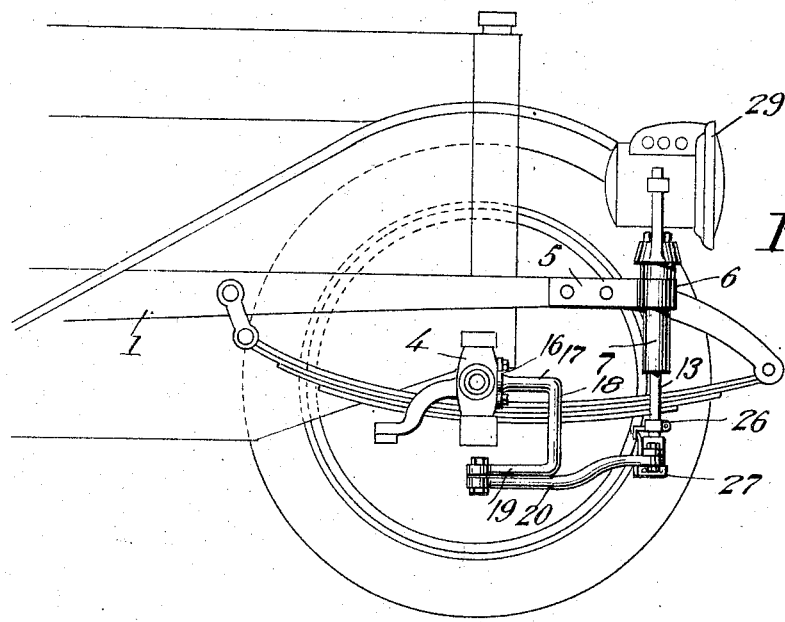
Figure 2:
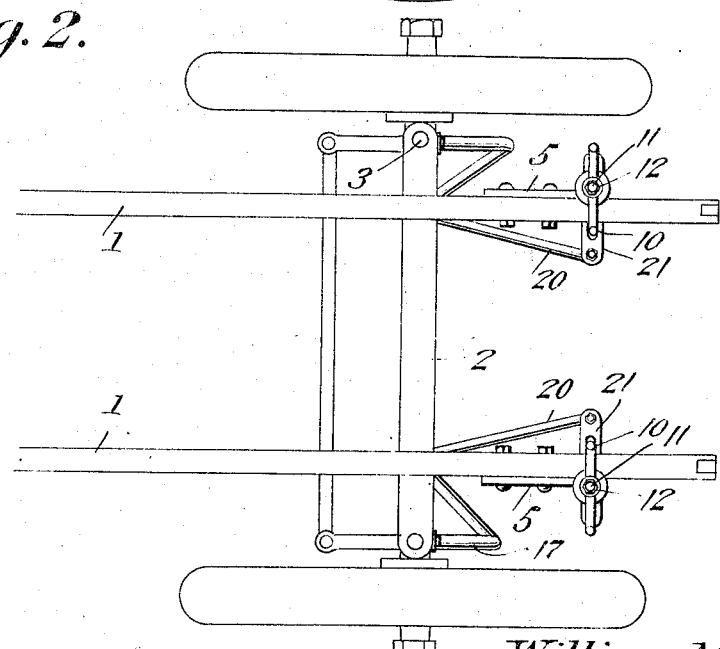

Referring to the drawings, forming a part of the specification, Figure 1 is a side view of the front portion of an automobile provided with a headlight and mountings therefor embodying the invention. Fig. 2 is a top plan view of the front portion of the chassis of an automobile provided with headlights mounted in accordance with the invention. Fig. 3 is a front view partly in section of an end portion of the front axle of an automobile provided with a lamp support and mountings embodying the invention. Fig. 4 is a perspective view of a lamp support and connections. Fig. 5 is a sectional view on the line 5—5 of Fig. 4.

Corresponding and like parts are referred to in the following description, and indicated in all the views of the drawings, by the same reference characters.

The numeral 1 designates the longitudinal bars of the chassis of an automobile and 2 represents the axle to which the spindle is connected by means of knuckles in any desired way. Each end of the axle 2 is forked or provided with spaced portions which receive the vertical pin or bolt 3 by means of which the steering knuckle 4 is pivoted thereto. A strap 5 is bolted or otherwise secured to the front portion of each of the longitudinal bars 1 and has a sleeve 6 at its front end in which is mounted a tube or barrel 7, the same being free to turn but held against vertical movement. The tube or barrel 7 has an enlarged portion immediately above the bearing 6 to support the said tube and attached parts. The upper portion of the tube or barrel 7 above the enlargement 8 is externally threaded and receives a cap piece 9. The lamp supporting fork 10 is attached directly to the cap piece 9, the latter having a threaded stem 11 which extends through the fork and receives a nut 12. The upper part of the cap piece 9 is of conical form and enters a corresponding opening formed in the lower side of the fork 10. The construction is such that when the nut 12 is loose the fork 10 may be turned so that under normal conditions the rays of light will be thrown straight ahead when the machine is moving in a right line. A vertically arranged rod or bar 13 has its upper portion extending into the tube or barrel 7 and provided at its upper end with a head or stop 14. The rod or bar 13 is of angular form in horizontal section and enters a correspondingly formed opening in the lower end of the barrel so that the barrel 7 and rod 13 turn together while the part 13 is free to move vertically. A spring 15 arranged in the lower portion of the barrel 7 is confined between the head 14 and the lower end of the barrel and yieldingly supports the rod or part 13.

A plate 16 is adapted to be secured in any manner to the steering knuckle 4 and a rod projects therefrom and comprises a longitudinal portion 17, a vertical part 18 and a lateral arm 19, the latter being connected at its free end to a rod 20 which forms a connection between the said arm and a bar 21 adjustably connected to the lower end of the rod 13. The bar 21 has longitudinal slots 22 and 23, the slot 22 having a vertical arrangement and the slot 23 a horizontal arrangement, the two slots intersecting. The lower end of the rod 13 passes through the slot 22. A pin 24 is arranged to operate in the slot 23 and passes through a transverse opening formed in the rod 13. Rollers 25 are mounted upon the end portions of the pin 24 and operate in the slot 23. Clips 26 and 27 are fastened to the lower portion of the rod 13, the one above and the other below the bar 21. A flat spring 28 is supported at its ends by means of the clips 26 and 27 and exerts a lateral pressure against the bar 21 and pin 24, thereby holding the bar 21 in the located position. The link or connection 20 is secured at its ends to the arm 19 and bar 21 by means of pivot fastenings, thereby admitting of relative movement between the parts 19, 20 and 21 when the steering knuckle is moved to give direction to the machine so that the rays of light from the lamp 29 may be thrown in the direction of travel so as to illuminate the roadway in advance of the machine. The telescoping connection between the parts 7 and 13 admits of the vertical play between the axle and frame.

From the foregoing, taken in connection with the accompanying drawings, it will be understood that the invention provides a headlight attachment which may be readily applied to any mechanically propelled machine so as to shed the rays of light in advance of the machine and to illuminate the way when turning a corner or rounding a curve. The construction is such as to prevent relative vertical movement of the lamp or its support while at the same time admitting of the connecting means between the lamp support and steering knuckle compensating for relative movement between the axle and frame incident to the yield in the front springs.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In a headlight attachment for automobiles, the combination of telescoping members, the one adapted to be attached to the frame of the machine and provided with a lamp support, a bar adjustably mounted upon the other member and having intersecting longitudinal slots, one of the slots receiving the rod and a pin arranged to operate in the other slot and supported by means of said rod, and means connecting the bar to the steering knuckle.

2. In a headlight attachment, the combination of telescoping members, the one adapted to be attached to the frame of the machine and provided with a lamp support, a bar mounted upon the other member and provided with intersecting longitudinal slots, one of said slots receiving the said rod, a pin arranged to operate in the other slot and supported by means of the rod, clips mounted upon the rod, the one above and the other below the said bar, a spring carried by said clips and exerting a lateral pressure upon the bar and the pin supported thereby, and connecting means between the longitudinally slotted bar and the steering knuckle.

In testimony whereof I affix my signature in presence of two witnesses.

WILLIAM M. McKINNEY.

Witnesses:
 IDA M. FINK,
 W. P. DICKSON.

---

Copies of this patent may be obtained for five cents each, by addressing the "Commissioner of Patents, Washington, D. C."